United States Patent [19]

Godard et al.

[11] 4,287,465

[45] Sep. 1, 1981

[54] APPARATUS FOR REGULATING THE CHARGING OF A STORAGE BATTERY

[75] Inventors: Pierre Godard, Tremblay les Gonesse; Michel Billot, Drancy, both of France

[73] Assignee: Saft-Societe des Accumulateurs Fixes et de Traction, Romainville, France

[21] Appl. No.: 83,190

[22] Filed: Oct. 5, 1979

[30] Foreign Application Priority Data

Oct. 9, 1978 [FR] France .............................. 78 28752

[51] Int. Cl.³ .......................... H02J 3/32; H02J 7/04; H02J 7/34
[52] U.S. Cl. ..................................... 320/56; 320/61; 307/46; 307/66
[58] Field of Search ..................... 320/5, 6, 15, 16, 30, 320/39, 56, 61; 307/19, 20, 44, 46, 64, 66

[56] References Cited

U.S. PATENT DOCUMENTS

| | | | |
|---|---|---|---|
| 3,243,598 | 3/1966 | Grillo | 307/44 |
| 3,350,618 | 10/1967 | Barney et al. | 307/66 |
| 3,696,286 | 10/1972 | Ule | 307/66 X |
| 3,928,791 | 12/1975 | Mullersman | 320/15 X |
| 3,956,638 | 5/1976 | Ahrens et al. | 307/44 X |
| 4,059,772 | 11/1977 | Wilkerson | 307/46 |
| 4,100,427 | 7/1978 | Durand et al. | 307/66 X |
| 4,114,082 | 9/1978 | Scheidler | 320/16 X |
| 4,194,146 | 3/1980 | Patry et al. | 324/76 A X |

*Primary Examiner*—J. V. Truhe
*Assistant Examiner*—Richard M. Moose
*Attorney, Agent, or Firm*—Kenyon & Kenyon

[57] ABSTRACT

An aleatory source of energy, e.g., a battery of photocells (1), supplies energy to a load (5) and to a storage battery (3). When the source is supplying more energy than is being drawn by the load, the storage battery is charged; when the source is supplying less than the demand, the shortfall is made up by drawing energy from the storage battery. The state of charge of the storage battery is monitored by a meter (8) which governs a regulator (7). Once the battery is charged to a predetermined threshold, the amount of current it draws from the source is regulated, and energy supplied by the source in excess of the combined requirements of the load and of battery charging is diverted to a storage means (6) other than the storage battery (e.g., a mains electricity supply grid). The flows of energy to both the battery and the other storage means are controlled by the regulator (7) as a function of the state of charge of the battery.

8 Claims, 3 Drawing Figures

APPARATUS FOR REGULATING THE CHARGING OF A STORAGE BATTERY

BACKGROUND OF THE INVENTION

1. Field of the Invention

The present invention relates to apparatus and a method for regulating the charging of a storage battery from an aleatory source of energy such as a battery of photocells. In such apparatus the battery of photocells supplies energy whenever it receives light, regardless of whether or not the storage battery is charged.

2. Description of the Prior Art

The charging of a storage battery is generally regulated by a regulator connected in parallel, the regulator serving to reduce or interrupt the current supplied to the storage battery whenever the battery reaches a desired level of charge. The regulator usually further includes means for dissipating the excess energy once the battery has been completely charged.

The excess energy is thus wasted. It is advantageous to conserve it either in the form of potential energy by pumping water or in the form of heat energy by heating material of large thermal capacity or else in the form of electricity injected into a mains grid.

Conventional regulation connected in parallel with the storage battery is no the best way of solving this problem. An object of the present invention is to provide apparatus for regulating charging of the storage battery in such a manner that the excess energy can be conserved.

SUMMARY OF THE INVENTION

The present invention provides apparatus for regulating the charging of a storage battery from an aleatory source of energy, said battery feeding a load, the apparatus being arranged so that whenever the battery has been charged to a given level of charge, and the energy being supplied by the source is in excess of that drawn by the load, the excess energy from the source is diverted in the form of an electric current to conserving means other than the storage battery, the allocation of available electric current to the storage battery and to the other conserving means being controlled by a parameter representative of the state of charge of the battery.

In the preferred embodiment the regulation parameter is the battery voltage. A second parameter can also be used, namely the quantity of energy stored in the battery as measured by an ampere-hour meter.

In one particular embodiment which uses a mains grid as the conserving means other than the storage battery, the regulation parameter is the voltage across the terminals of the storage battery, which is applied to the speed regulator of a DC motor fed from the said storage battery and driving an asynchronous machine for feeding power into the said grid.

The present invention also provides a method of husbanding electrical energy from an aleatory source, and of feeding said energy to a load, the method comprising:

providing a storage battery;

feeding the load with energy derived from the aleatory source;

making up any shortfall in energy from the aleatory source by drawing stored energy from the battery;

monitoring the state of charge of the battery; and whenever the aleatory source is supplying energy in excess of that being drawn by the load, using said excess energy: firstly to charge the battery until the charge in the battery reaches a predetermined threshold level; and secondly, when the battery is charged to at least the threshold level, diverting excess energy in the form of electric current to conserving means other than the storage battery, the allocation of available energy to the storage battery and to the said other storage means being controlled as a function of a parameter representative of the state of charge of the battery.

BRIEF DESCRIPTION OF THE DRAWINGS

An embodiment of the invention is described by way of example with reference to the accompanying drawings in which.

DESCRIPTION OF THE PREFERRED EMBODIMENT

Figure 1:
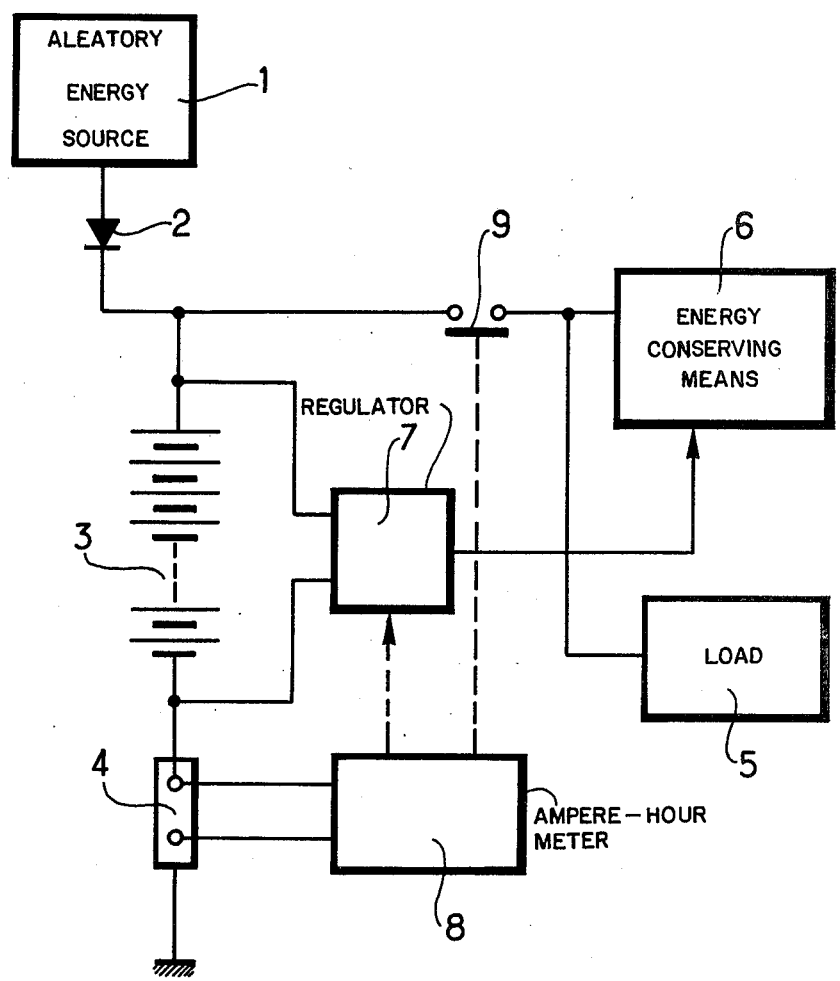
FIG. 1 is a block diagram of apparatus for regulating the charging of the storage battery in accordance with the invention.

In FIG. 1 an aleatory source of energy 1, e.g., a battery of photocells receiving light from the sun, is used to charge a storage battery 3 via a diode 2. A portion of the energy supplied by the aleatory source is consumed in a load 5 (lighting, heating, etc.) for which the system is provided. Excess energy which is neither consumed by the load 5 nor storable in the battery 3 once fully charged, is delivered to another conserving means 6. The delivery of energy to the other conserving means 6 is regulated by a regulator 7 which receives information directly related to the state of charge of the battery, e.g., the voltage across the battery terminals.

The energy supplied from the aleatory source 1 may be further regulated by means of an ampere-hour meter 8 connected across a current-sensing resistor 4, itself connected in series with the storage battery. An output from the meter 8 is used to modify the reference voltage used by the regulator when the storage battery is fully charged, and to disconnect the load circuit by means of a switch 9 when the usable capacity of the storage battery has been depleted.

A particular embodiment of the invention is described below with reference to apparatus for regulating the charging of a storage battery from photocells. The normal use of energy supplied by the storage battery is the domestic electricity supply for a group of houses; whenever necessary this supply of energy to the houses is augmented by electricity from a main supply grid. Any energy supplied by the photocells in excess of the requirements for charging the storage battery and supplying the load is conserved by transforming this energy into alternating current at the frequency and voltage of the main supply grid, and by feeding this AC into the grid.

Figure 2A:
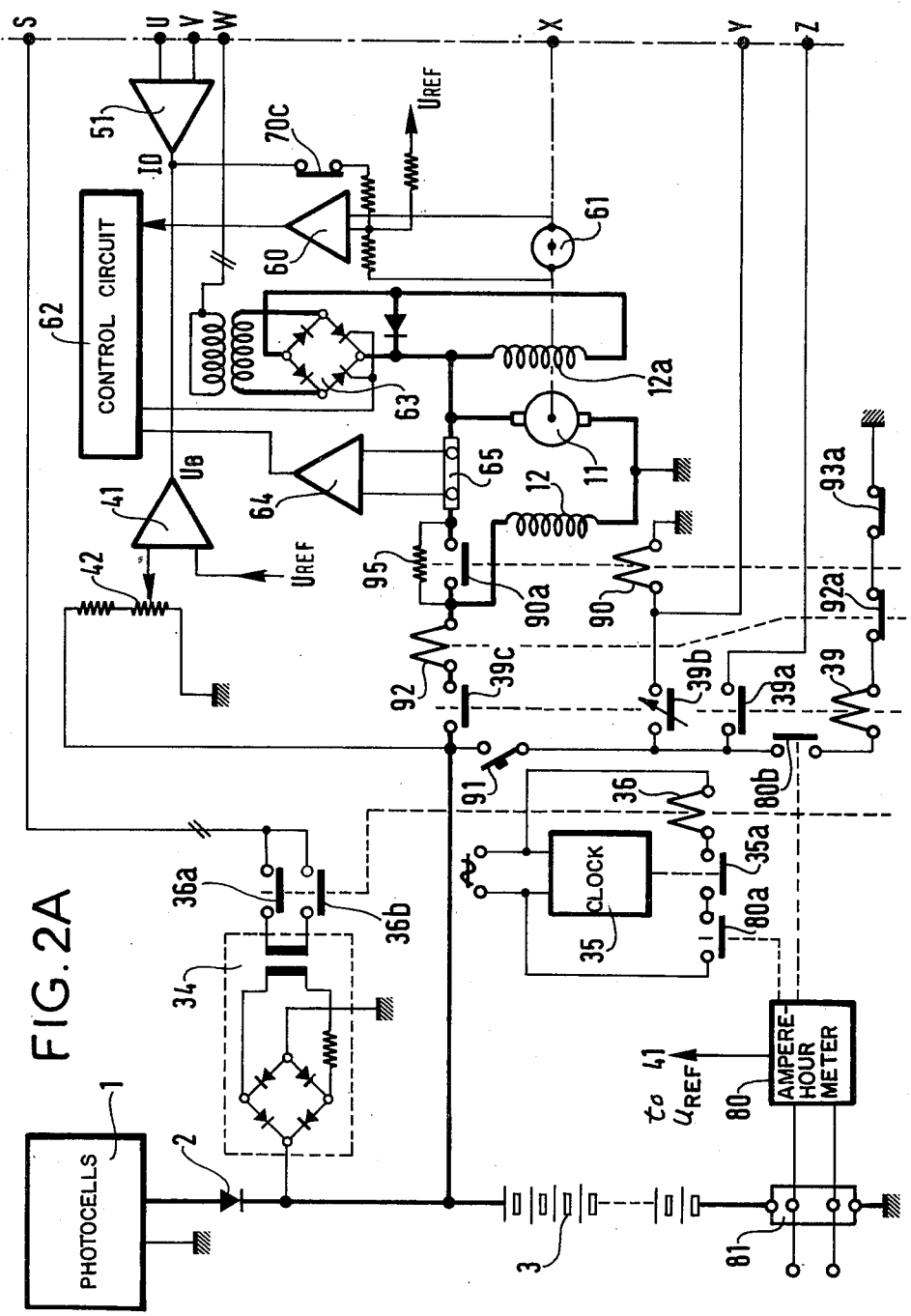
FIGS. 2A and 2B constitute a circuit diagram of a particular embodiment of the apparatus outlined in the block diagram of FIG. 1.
Figure 2B:
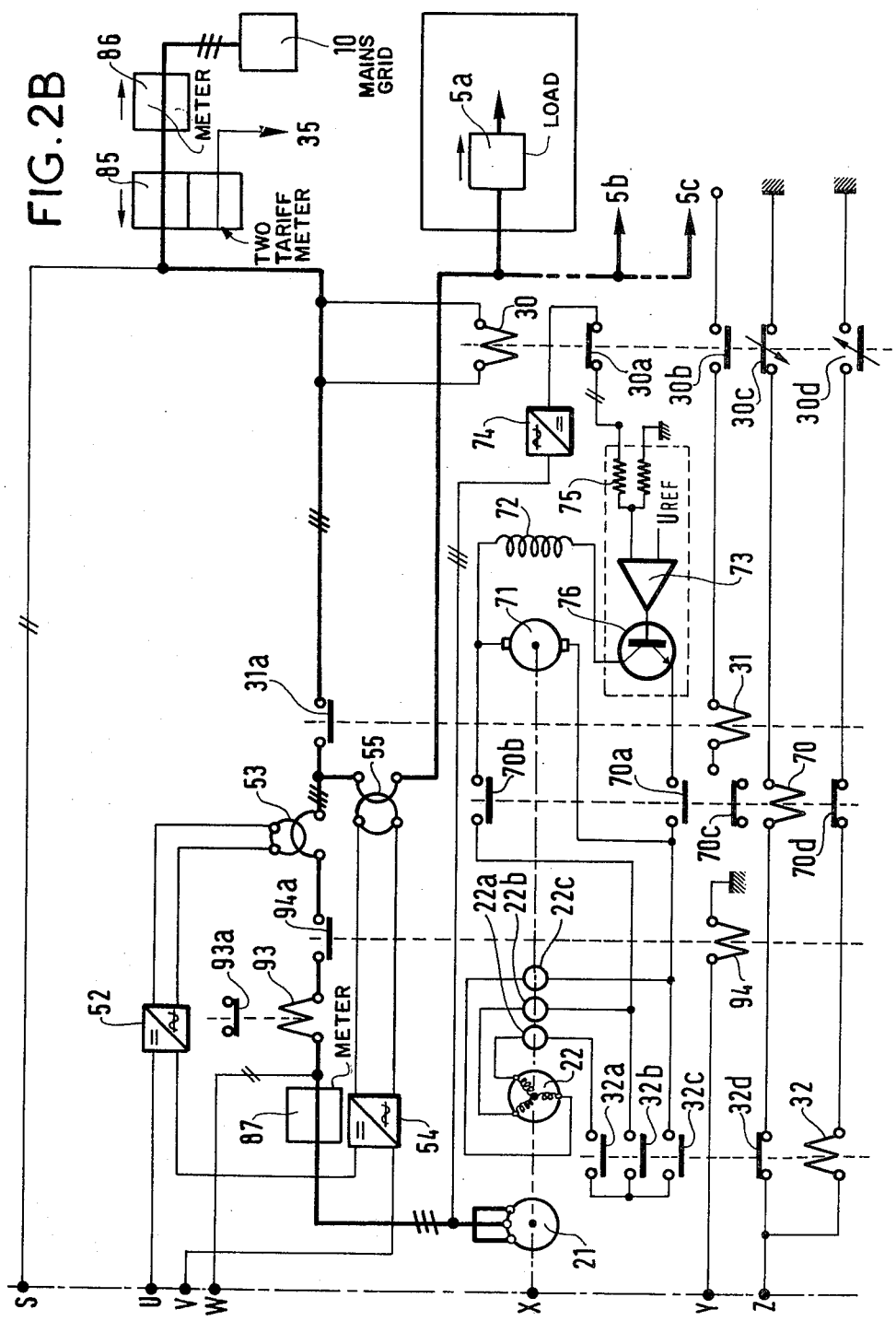

FIGS. 2A and 2B together form a simplified circuit diagram of the preferred apparatus used to implement the invention in the application outlined above. They should be placed side by side so that the letters S, U, V, X, Y, and Z on the two diagrams coincide.

In these figures, block 1 designates a battery of photocells feeding power to a storage battery 3 via a diode 2. The normal load for battery 3 is a group of houses 5a, 5b, 5c, and so on. Peaks in demand are supplied from the main electricity supply grid, symbolized by block 10. Two- and three-conductor connections are symbolised in this drawing respectively by two or three slashes (e.g.//) through a single line. Thus, for example, the grid 10 is shown having a three phase connection to the apparatus.

For use in the houses, the energy supplied by the photocells and/or storage battery is converted into AC by means of a generator set comprising a DC motor 11 having a parallel excitation winding 12 and an asynchronous machine having a stator 21, and a rotor 22 on the same shaft as the motor.

When the battery 3 is charged above a threshold value, the asynchronous machine operates nonsynchronously as a generator, supplying power to the houses. If the photocells are supplying energy, any excess is fed into the main grid, and any deficit is made up by the battery.

For the asynchronous machine to operate as a generator, it is necessary for the rotor slip rings 22a to 22c to be short circuited. This is performed by actuating from the main supply grid a normal-relief relay having a winding 30 and contacts 30a to 30d. The closing of contact 30d operates a relay 32, whose contacts 32a to 32c then close.

At night during off-peak hours, and if the battery has discharged a large proportion of its capacity, e.g., following a sunless day, the battery is recharged from the grid via a charger 34. Charging from the grid is limited to off-peak periods by a clock 35, which closes a contact 35a during off-peak hours. The state of the battery is detected by an ampere-hour meter 80 having contacts 80a and 80b. When the battery is discharged to below a given threshold, following a sunless day, for example, the contact 80a closes; then at the beginning of the low rate off-peak period, the clock closes its contact 35a. A relay 36 is then excited and closes its contacts 36a and 36b, thereby connecting the main grid 10 to the charger 34. The ampere-hour meter 80, is preferably an up/down counter, advantageously of the type described in the commonly assigned French published patent application No. 2,361,754, corresponding to U.S. Ser. No. 823,659, now U.S. Pat. No. 4,194,146, incorporated herein by reference.

The generator set, and consequently the charging of the storage battery, is regulated as follows:

information $U_B$ concerning the voltage across the terminals of the battery is obtained at the output of an operational amplifier 41, having one input connected to a reference voltage $U_{REF}$ and its other input connected to the positive pole of the battery via a potentiometer 42. The reference potential $U_{REF}$ is representative of full charge, but its exact value is modifiable by the meter 80;

information $I_D$ concerning the difference between the total energy being supplied by the generator set and the energy being supplied to the load 5 is available at the output of an operational amplifier 51 having one of its inputs connected by a rectifier 52 to the secondary winding of a current transformer 53 whose primary winding is looped around the output cable of the stator 21, and another of its inputs connected via a rectifier 54 to the secondary winding of a current transformer 55 whose primary is looped around the cable feeding the load.

The operational amplifiers 41 and 51 have diode-protected outputs which are simply commoned together so that it is the greater of their two output voltages which appears at their common output. The polarities are so arranged that so long as the battery voltage is below $U_{REF}$, the information $I_D$ is effective at their common output, and once the battery voltage exceeds $U_{REF}$, it is the information $U_B$ which is effective at their common output.

When the battery is sufficiently charged (e.g. to 50% capacity) to start up the generator set by means of a relay 39 with contacts 39a to 39c, as will be explained below, it is the information $I_D$ which is available at the commoned output of the amplifiers 41 and 51. This information is used to modify the speed reference for the generator set as given by a tachometer dynamo 61 associated with the shaft of the generator set. This modified speed reference is applied to an operational amplifier 60.

The information at the output of the amplifier 60 is supplied to a conventional thyristor control circuit 62 for controlling the firing of thyristors in a mixed bridge 63 which feeds a supplementary subtractive winding 12a in the field winding of the motor 11. The speed of the motor is thus regulated to equalize the current supplied by the generator to the current drawn by the load, up to the limit current of the motor.

This limit is monitored by information representative of current flowing through the motor armature as supplied by an operational amplifier 64 with its inputs connected across a shunt 65.

The outputs of the operational amplifiers 60 and 64 are also diode-protected and simply commoned together. Their common output is applied to a control input of the thyristor control circuit 62 to determine the phase instants at which the thyristors are fired. The control circuit 62 also has a phase reference input connected to the primary winding of the transformer from which the bridge 63 draws its current. In the absence of a control voltage, the control circuit 62 is arranged to fire the thyristors as soon as possible in each half cycle of the reference phase, and the effect of increasing voltage being applied to its input is to increasingly retard the firing instants. Thus in normal operation the current sensing amplifier 64 supplies a smaller output voltage than the tachometer sensing amplifier 60, thereby leaving control to the amplifier 60. However, as the armature current increases, so does the output voltage of the current-sensing amplifier 64, and at excessive armature current the thyristors are thus automatically transferred to the control of the current-sensing amplifier 64.

When the battery voltage exceeds a predetermined value representing full charge, it is information $U_B$ which appears at the common output of the amplifiers 41 and 51 to correct the order signal from the tachometer generator. The corrected order signal speeds up the generator set, and the current which the generator supplies in excess of that needed by the load is applied to the main grid, while the battery voltage is maintained at a constant value.

If there is a power outage, a relay 30 in the main line is deenergized, thereby opening its contact 30d, which releases the relay 32, thus opening its contacts 32a and 32c and removing the short circuit across the slip rings of the rotor 22 of the asynchronous machine. At the same time, the winding of a relay 31 is deenergized by opening of contact 30b, and the mains power supply contact 31a is opened. A relay 70 is energized by the closing of contact 30c, thereby closing its contacts 70a and 70b to excite the rotor 22 of the asynchronous machine via an excitation generator 71 after a delay (e.g., 5 seconds) produced by a delay contact 30c. The asynchronous machine then operates synchronously as an alternator, with its alternating voltage regulated by regulating the current in inductor 72 of the generator 71 by means of an operational amplifier 73 which has one input connected to a reference voltage $U_{REF}$ and its other input proportional to the stator voltage via a three-phase rectifier 74 and a resistive voltage divider 75, thereby biasing the base of a transistor 76 connected in series with the inductor 72.

After the main power is restored, the normal-relief relay 30, reoperates, the contact 30c opens, and the relay 70 is released, breaking the connection between the excitation and the rotor of the asynchronous machine (70a, 70b) and opening the contact 70c. After a delay (the contact unit 30d being delayed to ensure that the generator 71 is no longer excited), relay 32 is reenergized, again short circuiting the rotor slip rings.

The ampere-hour meter 80 receives information representative of the current passed through the battery by means of a current sensing resistor 81 connected in series with the battery. This makes it possible:

to automatically recharge the battery when its charge drops below a given threshold (e.g., 30% of its nominal charge) as explained above; and to stop the battery discharging once its discharge has reached a given level (e.g., when the battery is down to 20% of its nominal capacity) by the contact 80b releasing the relay 39 and thereby shutting down the generator set. The load is then supplied entirely from the main grid.

Once the battery has been recharged to a sufficient proportion of its total capacity (e.g., 50%) the meter's contact 80b closes, restarting the generator set via the relay 39, with a resistance 95 inserted in series in the armature circuit. A delay contact 39b short circuits this resistance by means of a contact 90a of a relay 90 once the generator set has reached sufficient speed. The delay contact 39b also causes a relay 94 to close its contact 94a thereby connecting the asynchronous machine to the load.

The generator set may be stopped and started manually by means of a contact 91.

The use of an asynchronous machine has numerous advantages, among them being that (a) there is no problem in coupling it to the grid, and (b) there is no risk of supplying power to a grid which has been deliberately disconnected (e.g., while work is being carried out thereon).

The energy supplied by the grid to the load is measured by a two-tariff meter 85, the tariffs for full-rate and off-peak rate being controlled by the clock 35. The energy supplied to the grid by the generator set is measured by a meter 86. The total energy supplied by the generator set is measured by the meter 87 and this information is used for monitoring and statistical purposes.

If too high a current is fed to the motor, a relay 92 opens a contact 92a; if the asynchronous machine is overloaded, a relay 93 opens a contact 93a.

The invention is in no way limited to the embodiments described. In particular the generator set could be replaced by an inverter having the same operating safety precautions.

It is also possible to have a plurality of generator sets receiving power from the same battery or from a plurality of batteries. If there is a power cut, one of the generator sets operates synchronously and the others are locked onto it.

Further, the details of the manner in which the energy flows are controlled can naturally be modified to suit specific requirements such as may be imposed by the Authority controlling any particular electricity grid. For example, it would be possible to use the battery to continue supplying energy to the grid for at least a short period after the sun has gone in, thereby smoothing fluctuations in total electricity supplied to the grid.

We claim:

1. Apparatus for regulating the charging of a storage battery from an aleatory source of electric energy in an electric energy supply system which includes an aleatory source of electric energy and a storage battery connected to said aleatory source for charging thereby, wherein said regulating apparatus comprises:

a motor-generator set which includes a variable speed motor driving an asynchronous machine for coupling the storage battery and the aleatory source to a load and to an AC mains electric supply grid;

means for diverting electric current being supplied by the system to said AC mains whenever the charge of the storage battery reaches a given level and the current available from the aleatory source exceeds the load demand; and means for controlling the allocation of said excess electric current from the aleatory source to the storage battery and to the AC mains as a function of at least one parameter representing the state of charge of the battery.

2. Apparatus according to claim 1, wherein said means for controlling the allocation of excess electric current from the aleatory source as a function of at least one parameter representing the state of charge of the battery comprises means for allocating the electric current as a function of the storage battery voltage.

3. Apparatus according to claim 2, wherein said control means further comprises means for metering the amount of energy stored in the storage battery, and said allocating means comprises means for allocating the electric current as a combined function of the storage battery voltage and of the output of said metering means.

4. Apparatus according to claim 1, wherein said control means comprises means for varying the speed of the electric motor as a function of the storage battery voltage.

5. Apparatus according to claim 4, wherein said regulating apparatus further comprises means for adjusting the current supplied by the motor-generator set to equal the current drawn by the load whenever the storage battery and the aleatory source are coupled to the load and the state of charge of the storage battery is less than said given value, said given value corresponding to a fully charged state.

6. Apparatus according to claim 4, further comprising first means for operating said asynchronous machine as a non synchronous generator, second means for operating said asynchronous machine as a synchronous alternator, and switching means for shifting the operation of said machine from the first means to the second means in the event of power shutoff from the main supply grid.

7. Apparatus according to claim 6, and comprising a plurality of said motor-generator sets, wherein said switching means shifts the operation of only one of the asynchronous machines from the first means to the second means in the event of a power cut in the AC main supply grid.

8. A method of husbanding electrical energy from an aleatory source and of feeding said energy to a load, the method comprising:
connecting a storage battery to the aleatory source;
feeding a load with energy derived from the aleatory source when the battery charge exceeds a predetermined threshold level;
making up any shortfall in energy from the aleatory source by drawing stored energy from the battery;
monitoring the state of charge of the battery; and
whenever the aleatory source is supplying energy in excess of that being drawn by the load, using said excess energy: firstly to charge the battery until the charge in the battery reaches a given reference value; and secondly, when the battery is charged to at least the reference value, diverting excess energy to a variable speed DC motor driving an asynchronous machine for supplying electric current to an AC mains, the allocation of available energy to the storage battery and to the AC mains being controlled as a function of a parameter representative of the state of charge of the battery.

* * * * *